(No Model.) 2 Sheets—Sheet 1.

C. R. PENFIELD.
BICYCLE STAND.

No. 576,351. Patented Feb. 2, 1897.

WITNESSES
M. L. Fossum
Chas Sahlstrand

INVENTOR
Charles R. Penfield
By J. W. Powers
Atty (No Model.) 2 Sheets—Sheet 2.

C. R. PENFIELD.
BICYCLE STAND.

No. 576,351. Patented Feb. 2, 1897.

WITNESSES
M. L. Foscum
Chas Sahlstrang

INVENTOR
Charles R. Penfield
By J. W. Powers
Atty

UNITED STATES PATENT OFFICE.

CHARLES R. PENFIELD, OF MINNEAPOLIS, MINNESOTA.

BICYCLE-STAND.

SPECIFICATION forming part of Letters Patent No. 576,351, dated February 2, 1897.

Application filed June 29, 1896. Serial No. 597,485. (No model.)

*To all whom it may concern:*

Be it known that I, CHARLES R. PENFIELD, a citizen of the United States, residing at Minneapolis, in the county of Hennepin and State of Minnesota, have invented new and useful Improvements in Bicycle-Stands, of which the following is a full, clear, and exact description, such as will enable others to construct the same, reference being had to the accompanying drawings, which form a part of this specification.

My invention relates to bicycle attachments, and my purposes are, first, to provide a light, cheap, and strong stand or rack adapted to hold a bicycle (when not in use) in an upright position; second, to provide a stand or rack adapted to be folded up and hung out of the way when not in use and to be closely packed for shipment. These objects I have attained, as will hereinafter be apparent.

My invention is fully illustrated in the accompanying drawings, in which—

Figure 1:
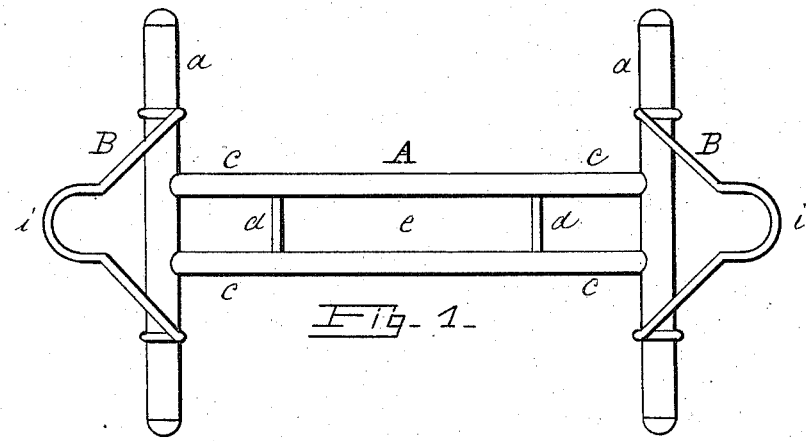
Figure 2:
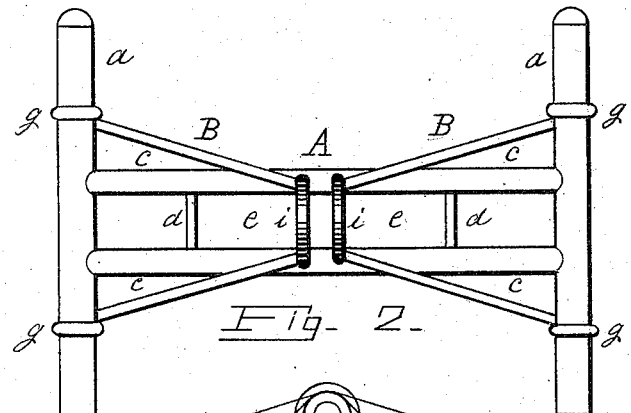
Figure 3:
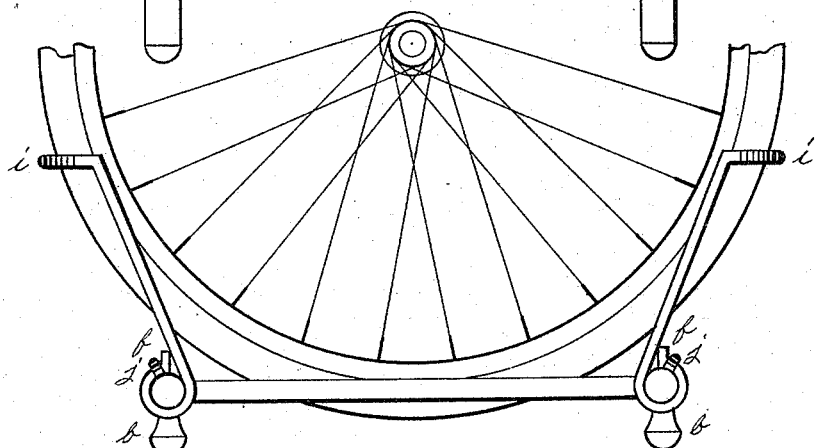
Figure 4:
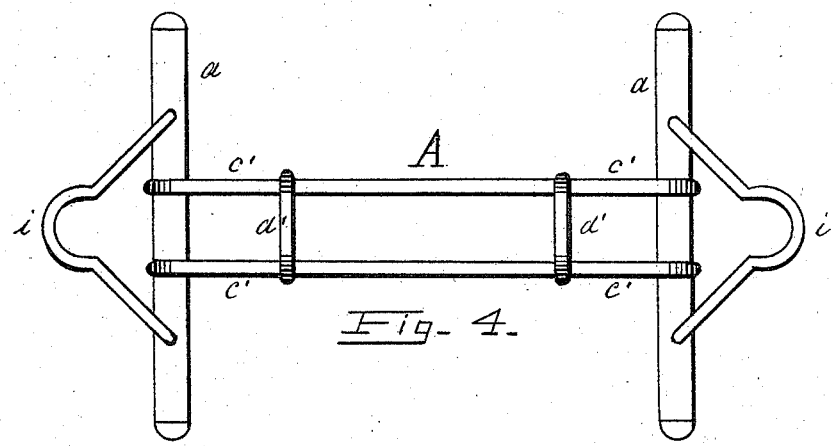
Figure 5:
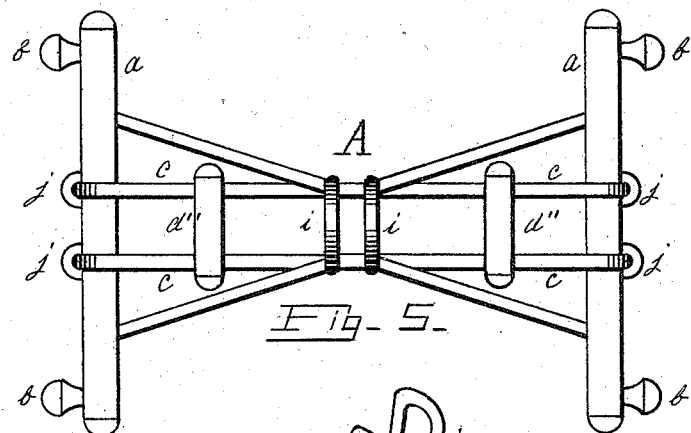

Figure 1 is a top view of my stand opened; Fig. 2, the same closed; Fig. 3, a side elevation as in use; Fig. 4, a top view of a modified construction opened; Fig. 5, the same closed, and Figs. 6 and 7 details.

Similar letters refer to similar parts throughout the several views.

I may construct my stand wholly of wood, but prefer to make it partly of wood and partly of metal. The frame A (the part formed in part or in whole of wood) consists of two parallel sills $a$, supported off the floor by the feet $b$. These sills I preferably turn from hard wood, fashioning them about one and one-fourth inches in diameter and thirteen inches long. These sills are connected by two parallel rods $c$, which (if made of wood) should be about three-fourths inch in diameter and eighteen inches long. These rods in turn are connected by two parallel ties $d$, which should be about one-fourth inch in diameter and two and one-half inches long. These ties should be about eight inches apart, to the end that the aperture, bounded by them and the rod $c$, may be about two by eight inches in size.

Figure 6:
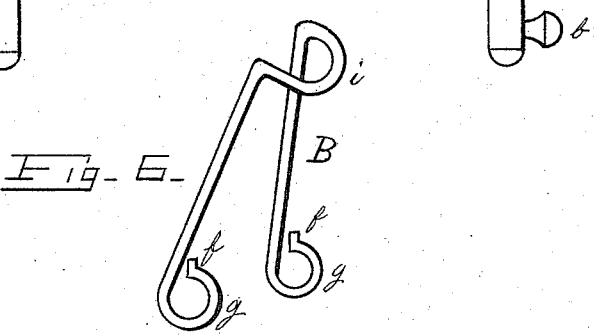
Figure 7:
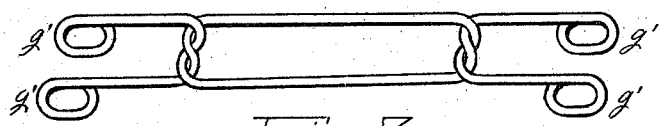

The supports B, one of which is shown detached in the detail Fig. 6, I fashion as follows: Taking a piece of hard brass or steel wire about thirty inches long (No. 4 wire being best adapted to the purpose) I bend its ends to form the lugs $f$. I then form the circular coils $g$, the inside diameters of which are respectively about one and one-fourth inches. I then bend the wire to form two parallel bars of equal length, united at one end by a semicircular portion $h$. These bars should be about two inches apart. Then about two and one-half inches from the semicircular end $h$ I bend the parallel bars at an angle of about ninety degrees, thus forming the lateral semioval loop $i$. I then spread the coiled ends until the bars indicate about a thirty-degree angle, as shown, which completes the support. In putting my stand together (the parts being prepared) I first unite the ties $d$ and the rods $c$. I then place the sills $a$ within the coils $g$ of the supports B. I then force the rods $c$ into the sills $a$ and complete the stand by driving the staples $j$ into the sills $a$, astraddle the coils $g$ of the supports B. These staples serve both to keep the coils $g$ of the supports B from moving longitudinally upon the sills $a$ of the frame A and to limit the distance that the said coils may revolve upon the said sill, the lugs $f$ operating as stops, thereby locating the position of the lateral semioval loops $i$, which should be about twenty-five inches apart. It will be seen that these loops $i$ form two bearing-points for the bicycle-wheel, while the aperture $c$ forms the third, thus supporting the wheel in an upright position, as shown in Fig. 3, and that through the flexibility of the wire supports B my stand is automatically adjustable to wheels of different diameters.

In the modification shown in Figs. 4 and 5 I make the rods $c'$ of metal, fashioning their ends into circular coils $g'$, designed to encircle the sills $a$. These rods may be connected by means of the parallel ties $d'$, coiled about them, as shown in Fig. 4, may pass through pierced ties $d''$, as shown in Fig. 5, or may be fashioned to form their own ties by bending and interlocking them, as shown in the detail Fig. 7. In this construction I fashion the supports B without the lugs $f$ and the coils $g$ and affix them rigidly within the sills $a$, as shown in Figs. 4 and 5.

In putting this stand together (the parts being prepared) I first unite the ties $d'$ and the rods $c'$. I then place the sills $a$ within the coils $g'$ of the rods $c'$ and secure them in place by driving therein the staples $j'$ astraddle the said coils $g'$, as shown in Fig. 5, and complete the stand by rigidly affixing the supports B within the sills $a$.

The only difference between the construction first above described and the modification referred to is in detail; hence belong to the same invention. In the former the supports revolve upon the sills in opening or closing my stand, and in the latter the sills revolve within the rods for the same purpose, and in both cases the results are the same. I therefore regard the differences as immaterial and reserve the right to construct them either way.

Having thus described my invention, what I claim as new, and desire to secure by Letters Patent, is—

The combination in a bicycle-stand, of a frame, having the sills $a, a$, fashioned with the feet $b, b$, the parallel rods $c, c$, connecting the said sills and the parallel ties $d, d$, connecting the said rods; with supports having the lugs $f$, coils $g$, and loops $i$, substantially as shown, whereby the said supports may be folded upon the said frame, as specified.

CHARLES R. PENFIELD.

Witnesses:
M. L. FOSSUN,
CHAS. SAHESTRAND.